United States Patent
Stantchev

(10) Patent No.: US 9,964,382 B2
(45) Date of Patent: May 8, 2018

(54) TARGET ACQUISITION DEVICE AND SYSTEM THEREOF

(71) Applicant: George Stantchev, Phoenix, AZ (US)

(72) Inventor: George Stantchev, Phoenix, AZ (US)

(73) Assignee: George Stantchev, Phoenix, AZ (US)

( * ) Notice: Subject to any disclaimer, the term of this patent is extended or adjusted under 35 U.S.C. 154(b) by 0 days. days.

(21) Appl. No.: 15/347,080

(22) Filed: Nov. 9, 2016

(65) Prior Publication Data

US 2017/0299335 A1 Oct. 19, 2017

Related U.S. Application Data

(60) Provisional application No. 62/255,502, filed on Nov. 15, 2015.

(51) Int. Cl.

| | |
|---|---|
| *G06F 19/00* | (2018.01) |
| *G06G 7/80* | (2006.01) |
| *F41G 3/16* | (2006.01) |
| *F41G 3/06* | (2006.01) |
| *F41G 3/08* | (2006.01) |
| *H04W 4/00* | (2018.01) |
| *H04W 4/02* | (2018.01) |

(52) U.S. Cl.
CPC .............. *F41G 3/165* (2013.01); *F41G 3/06* (2013.01); *F41G 3/08* (2013.01); *H04W 4/008* (2013.01); *H04W 4/02* (2013.01)

(58) Field of Classification Search
USPC ................................................. 235/404, 414
See application file for complete search history.

(56) References Cited

U.S. PATENT DOCUMENTS

| | | | |
|---|---|---|---|
| 6,813,025 B2* | 11/2004 | Edwards | F41G 1/38 356/422 |
| 7,329,127 B2 | 2/2008 | Kendir et al. | |
| 2005/0268521 A1* | 12/2005 | Cox | F41G 1/38 42/130 |
| 2009/0306892 A1 | 12/2009 | Malka et al. | |
| 2011/0252684 A1 | 10/2011 | Ufer et al. | |
| 2012/0000979 A1 | 1/2012 | Horvath et al. | |

(Continued)

FOREIGN PATENT DOCUMENTS

| | | |
|---|---|---|
| TW | 318225 | 10/1997 |
| TW | M241630 | 8/2004 |

(Continued)

*Primary Examiner* — Tuyen K Vo
(74) *Attorney, Agent, or Firm* — Rosenberg, Klein & Lee

(57) ABSTRACT

A target acquisition device and a system thereof called ArmConnect™ are disclosed. The target acquisition device of the present invention comprises an optical module, an image sensor, a compass, an acceleration sensor, an accessory connector, a display and a sight control circuit. The target acquisition system of the present invention comprises a target acquisition device, a range finder and a mobile device, wherein the target acquisition device further comprises a wireless transmission module for connecting to the mobile device. The range finder is connected to the target acquisition device by the accessory connector. Some assistant devices, such as a remote control, a weather station, a night vision, a recorder, a camera and etc., can also be connected to the target acquisition device for providing supports to make the ammunition hit the target.

19 Claims, 6 Drawing Sheets

(56) References Cited

U.S. PATENT DOCUMENTS

| | | | |
|---|---|---|---|
| 2012/0097741 A1* | 4/2012 | Karcher | F41G 1/38 |
| | | | 235/404 |
| 2014/0110482 A1 | 4/2014 | Bay | |
| 2014/0264020 A1* | 9/2014 | Patton | G01J 5/10 |
| | | | 250/330 |
| 2014/0281851 A1* | 9/2014 | McHale | F41G 1/38 |
| | | | 715/202 |
| 2014/0366421 A1* | 12/2014 | Arif | F41A 17/063 |
| | | | 42/70.11 |
| 2014/0367918 A1* | 12/2014 | Mason | F41J 5/04 |
| | | | 273/371 |
| 2015/0106046 A1 | 4/2015 | Chen et al. | |
| 2015/0153130 A1* | 6/2015 | Amis | A63F 13/04 |
| | | | 434/21 |
| 2015/0177362 A1* | 6/2015 | Gutierrez | B60R 25/245 |
| | | | 701/519 |
| 2015/0300786 A1* | 10/2015 | Downing | H04W 84/12 |
| | | | 235/404 |
| 2015/0345887 A1* | 12/2015 | Shneorson | F41A 19/59 |
| | | | 89/28.1 |
| 2016/0292924 A1* | 10/2016 | Balachandreswaran | G06T 19/006 |

FOREIGN PATENT DOCUMENTS

| | | |
|---|---|---|
| TW | I356156 | 9/2009 |
| TW | I488052 | 6/2015 |

* cited by examiner

TARGET ACQUISITION DEVICE AND SYSTEM THEREOF

This application is based on Provisional application Ser. No. 62/255,502, filed Nov. 15, 2015, currently pending.

FIELD OF THE INVENTION

The present invention is related to a weapon sight, more particularly to a target acquisition device and a system thereof which integrate vital information with image and shown on the display.

BACKGROUND OF THE INVENTION

Over the years, various techniques and devices have been developed to help a person accurately aim a weapon, such as a rifle. One common approach is to mount a sight or scope on the weapon. A person then uses the sight or scope to view an intended target in association with a reticle, often with a degree of magnification. Although existing weapon sights have been generally adequate for their intended purposes, they have not been satisfactory in all respects.

For example, it is very common for a shooter to carry a rifle, a weapon sight as example a night vision device, a range finder, a weather station and a mobile device as example a cell phone. The sight is detachably coupled to the rifle, thereby effectively giving the shooter an integrated weapon that can enhance a vision and acquire a target. On other side, the range finder is attached to either the sight or the rifle, the weather station is usually a pocket or other type of portable device and the mobile device is either a radio station or a cell phone with network capabilities and additional gadgets for location. Usually each device has its own operation method and it is managed independently by the shooter.

To the extent some existing weapon sights include electronic circuitry that can provide a user with electronically calculated information to assist in aiming the weapon, this information is often not visible within the same field of view in which the target is visible, and is often presented digitally in the form of alphanumeric characters that are sometimes difficult to understand and use. A further consideration relates to the extent to which calculations based on a particular target ranging event remains available for use by a user.

SUMMARY OF THE PRESENT INVENTION

It is an objective of the present invention to provide a target acquisition device and a system thereof, more particularly a target acquisition device and a system thereof which integrate vital information with image and shown on the display.

It is another objective of the present invention to provide a target acquisition device comprising an accessory connector for connecting to an assistant device and receiving information for target acquisition.

It is still another objective of the present invention to provide a target acquisition device comprising a wireless transmission module for connecting to a remote control device, wireless weather station or a mobile device to obtain more powerful support for target acquisition.

It is still another objective of the present invention to provide a target acquisition system which is capable to connect to Internet to access a web service platform for data analysis and support.

The present invention provides a target acquisition device comprising: an optical module acquiring an image of a scene; an image sensor receiving the image from the optical module and generating an image signal; a compass determining an orientation and an elevation of the device and generating an orientation signal and an elevation signal respectively; an acceleration sensor determining transitions of the device and generating transition signals; an accessory connector for connecting to an assistant device; a display; and a sight control circuit connected to the image sensor, the optical module, the compass, the acceleration sensor, the accessory connector and the display for controlling the optical module to operate, receiving the image signal, the orientation signal, the elevation signal, the transition signals and signals from at least one assistant device; wherein the sight control circuit generates a reticle, combines the reticle and the received signals with the image signal and displays on the display.

In one embodiment of the present invention, the assistant device is selectively one of a remote control, range finder, a weather station, a global positioning system (GPS), a night vision, a recorder, a camera or the combination thereof.

In one embodiment of the present invention, the target acquisition device is selectively disposed on a weapon or a helmet.

In one embodiment of the present invention, the target acquisition device further comprises a wireless transmission module for connecting to a remote control or a mobile device.

The present invention further provides a target acquisition system comprising: a target acquisition device including: an optical module acquiring an image of a scene; an image sensor receiving the image from the optical module and generating an image signal; a compass determining an orientation and an elevation of the device and generating an orientation signal and an elevation signal respectively; an acceleration sensor determining transitions of the device and generating transition signals; an accessory connector; a wireless transmission module; a display; and a sight control circuit connected to the image sensor, the optical module, the compass, the acceleration sensor, the accessory connector, the wireless transmission module and the display for controlling the optical module to operate, receiving the image signal, orientation signal, elevation signal and transition signals; a range finder determining a range to a target and generating a range signal, wherein the range finder is paired with the target acquisition device and connected to the target acquisition device by the accessory connector; and a mobile device having a display, a GPS module and a wireless transmission module, wherein the mobile device is connected to the target acquisition device by the wireless transmission module of the mobile device and the wireless transmission module of the target acquisition device, the GPS module determines a location of the mobile device and generates a location signal; wherein the sight control circuit generates a reticle, receives the range signal from the range finder, the location signal from the mobile device, combines the reticle and the received signals with the image signal and displays on the display of the target acquisition device; wherein the mobile device receives the orientation signal, the elevation signal, the transition signals and the range signal from the target acquisition device and processes to find a location of the target, and display the location of the mobile device, the location of the target, the range, the elevation, the orientation and a map on the display of the mobile device.

In one embodiment of the present invention, the mobile device is able to connect to Internet and accesses a web service platform.

DETAILED DESCRIPTION OF THE PREFERRED EMBODIMENTS

Figure 1:
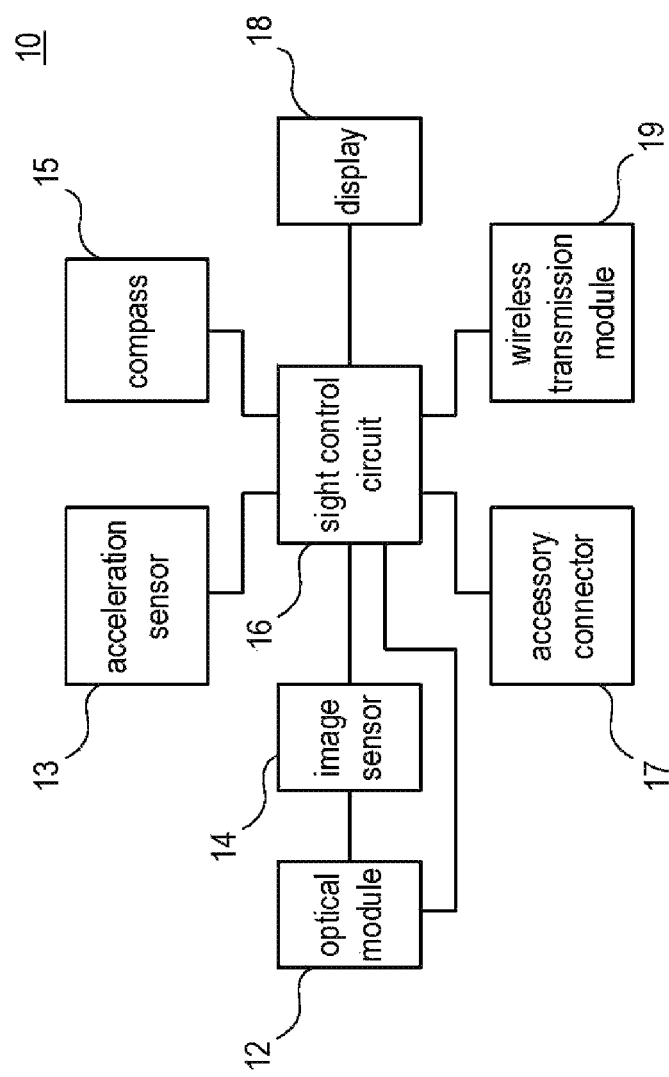
FIG. 1 is a schematic diagram showing a target acquisition device in accordance with one embodiment of the present invention.
Figure 2:
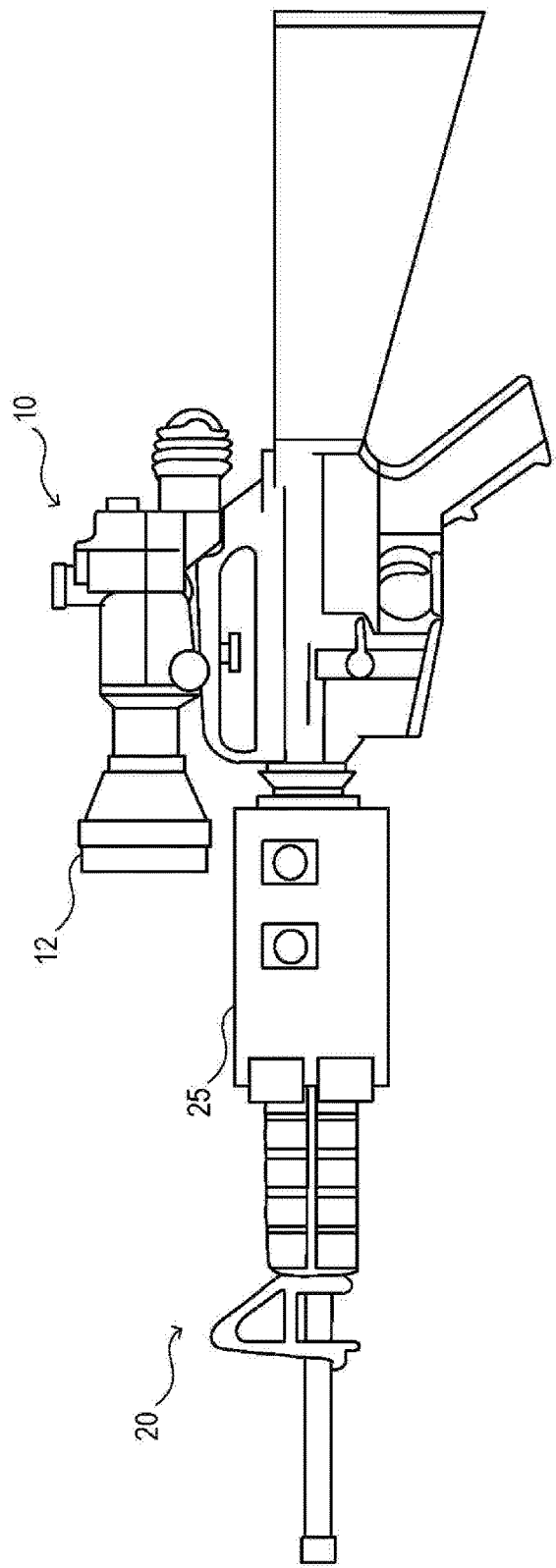
FIG. 2 is a schematic diagram showing a target acquisition device and a range finder attached on a rifle.
Figure 3:
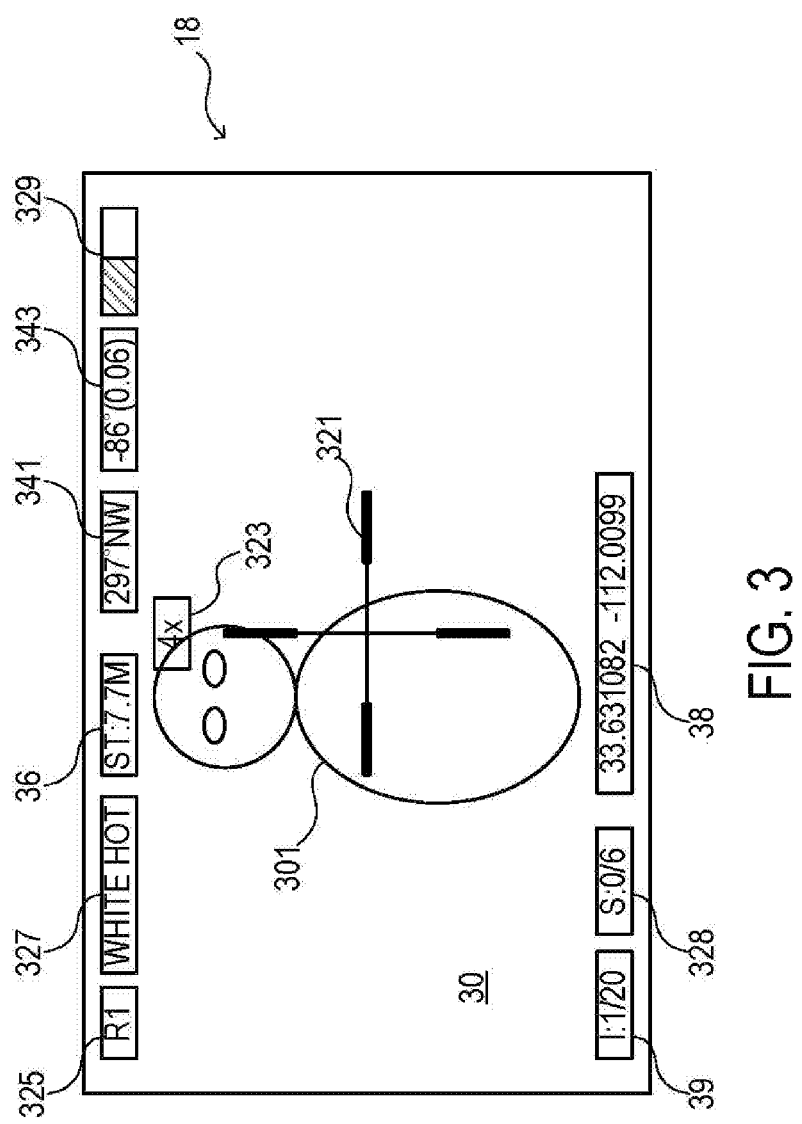
FIG. 3 is a schematic diagram showing an image on the display of the target acquisition device in accordance with one embodiment of the present invention.

Referring to FIGS. 1-3, there are shown schematic diagrams of a target acquisition device, a target acquisition device and a range finder attached on a rifle and an image on the display of the target acquisition device in accordance with one embodiment of the present invention. The target acquisition device 10 of the present invention comprises an optical module 12, an image sensor 14, a compass 15, an acceleration sensor 13, an accessory connector 17, a display 18 and a sight control circuit 16.

The optical module 12 is used for acquiring an image 30 of a scene. The image sensor 14 receives the image 30 passed through the optical module 12 and generates an image signal. The compass 15 determines the orientation and elevation of the device 10 and generates an orientation signal and an elevation signal respectively. The acceleration sensor 13 determines transitions of the device 10 and generates transition signals accordingly. The accessory connector 17 is configured to connect to an assistant device (such as a range finder 25) and receive signal (such as a range signal) from the assistant device. The sight control circuit 16 is connected to the optical module 12, the image sensor 14, the compass 15, the acceleration sensor 13, the accessory connector 17 and the display 18.

The sight control circuit 16 comprises a microprocessor, a memory storing an application and a plurality of control and driver circuit for controlling or driving the modules and elements to operate. The sight control circuit 16 controls the optical module 12 to focus on a target 301 and adjusts the magnification to obtain a desired image 30 for the user to observe the target 301. The sight control circuit 16 receives the image signal, the orientation signal, the elevation signal and the transition signals. The sight control circuit 16 generates a reticle 321, combines the reticle and the received signals with the image signal and displays on the display 18. And then, the user can obtain vital information, such as the target 301, the reticle 321, the orientation 341, the elevation 343 and the magnification 323, in the display 18 of the target acquisition device 10.

In one embodiment of the present invention, the target acquisition device 10 further comprises a wireless transmission module 19 for connecting to a mobile device, a remote control or an assistant device. The wireless transmission module 19 is selectively one of a wireless network (Wi-Fi) module, a Bluetooth module or the combination thereof. The mobile device is selectively one of a mobile phone, a personal digital assistant, a table computer or a laptop computer.

In one embodiment of the present invention, the sight control circuit 16 also accommodates an entry method as example keyboard, rotary encoder/s, touchscreen, touchpad and remote control using wired or wireless connection. The entry method in its simplest implementation may be 3 button pad where the functions of the buttons is as follow: Up, Down and Select. An example for five button configuration may be the above with added Left and Right function.

In one embodiment of the present invention, the remote control may repeat, extend or complement the sight control circuit 16 entry method as example if the sight control circuit 16 has 3 buttons, the remote control may be 5 buttons, etc. The remote control can connect via the accessory connector 17 if wired and via the wireless transmission module 19 if wireless. When wireless remote control is implemented it can be either in separate electronic package paired to the target acquisition device 10 via the wireless transmission module 19 or can be a phone application or part of such (please refer to the remote control function 561 in FIG. 5). The wireless transmission module 19 can be any type wireless one or two way communication device compliant to any general or custom protocols as example: Wi-Fi, Bluetooth, NFC, ISM, ZigBee, Ant, etc.

In one embodiment of the present invention, the transition signal generated by the acceleration sensor 13 are used for determining the direction and orientation changes of the target acquisition device 10, and can also be used for counting shots from the rifle 20 attached. In order to determine shots from the attached weapon, an acceleration profile is created in the sight control circuit 16. The acceleration profile corresponds to the mass of the weapon, sight and ammunition performance. The profile can be calculated and loaded or calculated based on limited number of shots produced. The forward and reversed acceleration of each shot is recorded and thresholds are set to recognize the device transition corresponding to a transition from an ammunition shot. Then the shots produced are counted according the threshold saved and displayed on the display 18 of the target acquisition device 10. The shots may be counted toward a cartridge size set in the target acquisition device 10 and shown as the short counter 328.

Figure 3A:
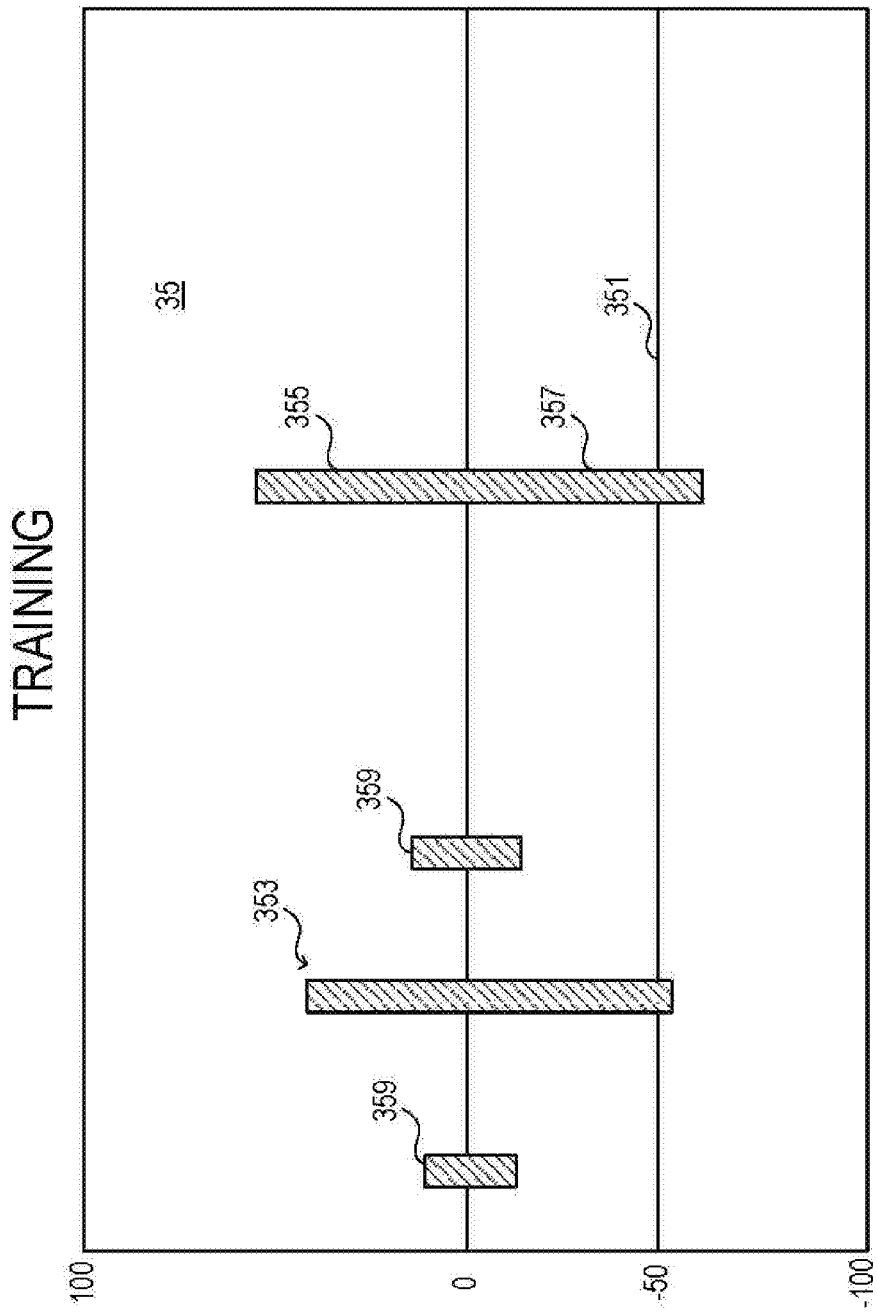
FIG. 3a is a schematic diagram showing a training image on the display of the target acquisition device in accordance with one embodiment of the present invention.

FIG. 3a shows a training image 35 on the display 18 of the target acquisition device 10 with transition signals 353 displayed where the threshold 351 can be set manually or automatic based on the shots produced. The threshold 351 is set to the positive acceleration 355 and the negative acceleration 357 of the rifle 20. The threshold 351 is set to only detect the transition signals 353 according to the shots and not to detect the acceleration noise 359 from ammunition loading and transport. The vertical scale of such training screen shows acceleration and the horizontal is time.

In one embodiment of the present invention, the assistant device is selectively one of a range finder 25, a remote control, a weather station, a global positioning system (GPS), a night vision, a recorder, a camera or the combination thereof.

The target acquisition device 10 of the present invention is usually disposed on a weapon, such as a rifle 20, or a helmet (not shown) for the user to aim at a target 301.

In one embodiment of the present invention, an assistant device, such as a range finder 25, can be paired with and connected to the target acquisition device 10 by the accessory connector 17. The range finder 25 is also attached to the rifle 20 or the target acquisition device 10 on the helmet for the user to determine the range to the target 301 and generate a range signal. The range signal is transmitted to the sight control circuit 16 by the accessory connector 17. And then, the sight control circuit 16 combines the range signal to the image signal and displays on the display 18. Consequently, the user can obtain the range 36 to the target in the display 18 of the target acquisition device 10.

In the similar way, the assistant devices, such as a remote control (not shown), a weather station (not shown), a GPS (not shown), a night vision (not shown), a recorder (not shown), a camera (not shown) and etc., can also be paired with and connected to the target acquisition device 10, and then the vital information, such as the wind speed (not shown), the location 38, the night image (not shown), the image count 39, the reticle type 325, the color pattern 327, the shot count 328 and the battery status 329, can be obtained by the user in the display 18 of the target acquisition device 10.

Figure 4:
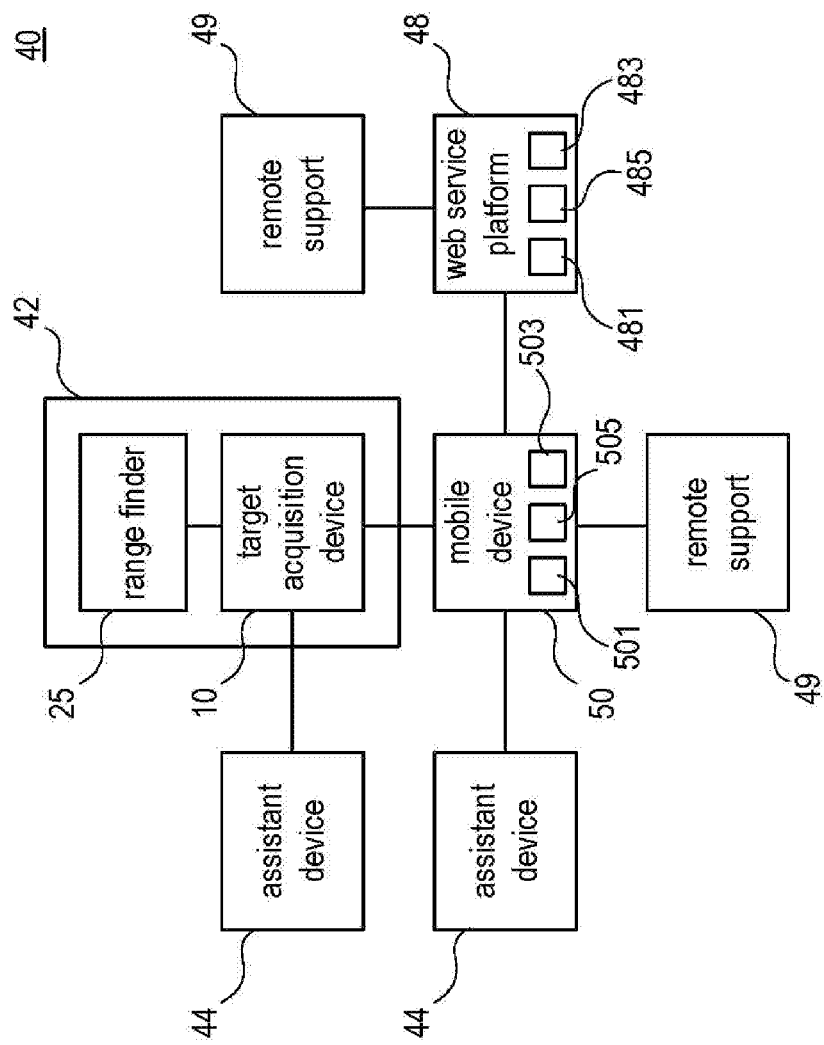
FIG. 4 is a schematic diagram showing a target acquisition system in accordance with one embodiment of the present invention.
Figure 5:
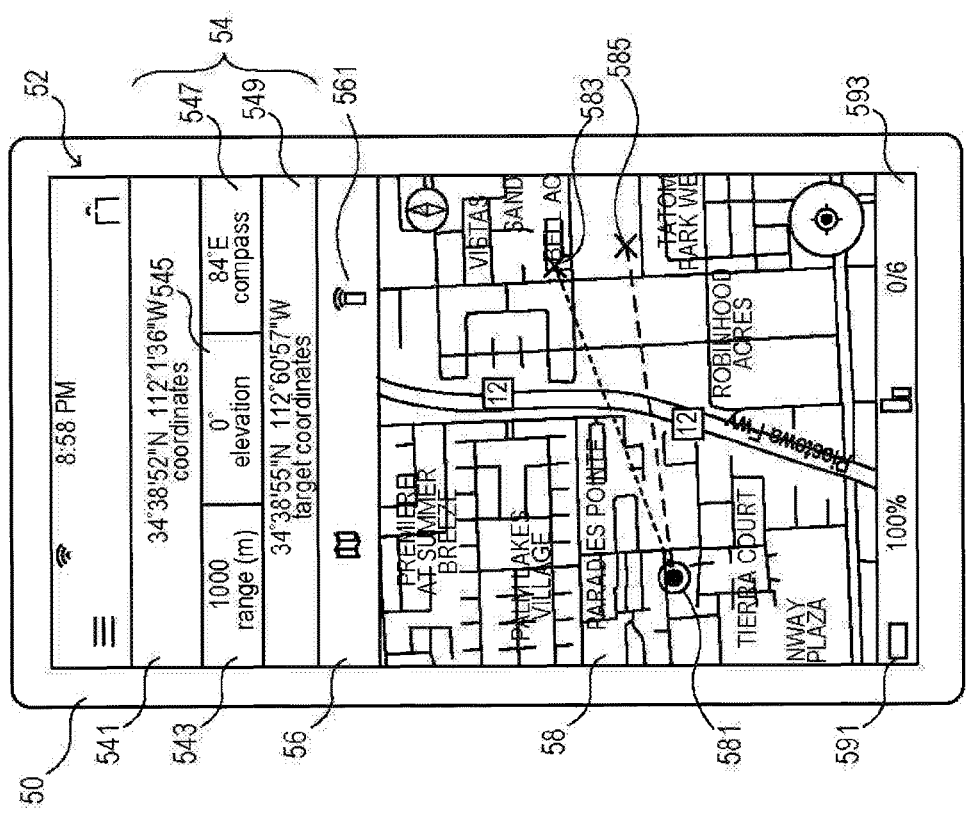
FIG. 5 is a schematic diagram showing an image on the display of the mobile device of the target acquisition system in accordance with one embodiment of the present invention.

Referring to FIGS. 4 and 5, there is shown a schematic diagram of a target acquisition system and an image on the display of the mobile device of the target acquisition system in accordance with one embodiment of the present invention. The target acquisition system 40 of the present invention comprises a target acquisition device 10, a range finder 25 and a mobile device 50.

The target acquisition device 10 comprises: an optical 12, an image sensor 14, a compass 15, an acceleration sensor 13, an accessory connector 17, a wireless transmission module 19, a display 18, and a sight control circuit 16, as shown at FIG. 1. The optical module 12 is used for acquiring an image of a scene. The image sensor 14 receives the image from the optical module 12 and generates an image signal. The compass 15 determines the orientation and elevation of the device 10 and generates an orientation signal and an elevation signal respectively. The acceleration sensor 13 determines transitions of the device 10 and generates transition signals accordingly.

The accessory connector 17 is configured to connect to the range finder 25 and receive signal from the range finder 25. The wireless transmission module 19 is configured to connect to the mobile device 50 to transmit and receive signal from the mobile device 50. The sight control circuit 16 is connected to the optical module 12, the image sensor 14, the compass 15, the acceleration sensor 13, the accessory connector 17, the wireless transmission module 19 and the display 18.

The range finder 25 determines the range to a target and generates a range signal. The range finder 25 is paired with the target acquisition device 10 and connected to the target acquisition device 10 by the accessory connector 17. In general, the range finder 25 and the target acquisition device 10 are attached together to a platform 42, such as a weapon or a helmet, such that the range finder 25 can determine the accurate range from the attached device 42 to the target.

The mobile device 50 comprises a display 52, a GPS module 503 and a wireless transmission module 501. The mobile device 50 is connected to the target acquisition device 10 by the wireless transmission modules 501 and 503. The GPS module 503 determines the location of the mobile device 50 and generates a location signal.

The sight control circuit 16 controls or drives the elements to operate and receives the image signal, the orientation signal, the elevation signal, the range signal and the location signal. The sight control circuit 16 generates a reticle, combines the reticle and the received signals with the image signal and displays on the display 18 of the target acquisition device 10 for the user to obtain vital information in the display 18 of the target acquisition device 10.

The mobile device 50 comprises a processing unit (not shown) and a memory module (not shown) storing an application 505. The processing unit executes the application to perform predetermined functions. In one embodiment of the present invention, the mobile device 50 receives the range signal, the orientation signal, the elevation signal and transition signals from the target acquisition device 10 and processes the signals with the location signal to determine the location of the target.

In one embodiment of the present invention, the mobile device 50 displays vital information 54 on the display 52 of the mobile device 50, such as the location of the mobile device 541, the range to the target 543, the elevation 545, the orientation 547 and the location of the target 549.

In one embodiment of the present invention, the mobile device 50 further shows a map 58 on the display 52, wherein the locations of the mobile device 581 and the target 583 are denoted in the map 58. The mobile device 50 of the present invention can further display the battery status 591 of the target acquisition device 10, the shot counter 593 and the function items 56 on the display 52. The shot counter 593 counts shots according to the transition signals.

In one embodiment of the present invention, the transition signals generated by the acceleration sensor 13 are used for determining the direction and orientation changes of the target acquisition device 10 and counting shots from an attached weapon. The acceleration profile can be created in the sight control circuit 16 or/and the mobile device 50. The shots may be counted toward a cartridge size set in the target acquisition device 10 or the mobile device 50 and shown as the short counter 593 (or 328 in FIG. 3).

In one embodiment of the present invention, the target acquisition system 40 further comprises an assistant device 44 selectively connected to the target acquisition device 10 or the mobile device 50 for providing assistant information. The assistant device 44 is selectively one of a weather station, a night vision, a camera or the combination thereof. If a weather station is connected to the target acquisition device 10 or the mobile device 50, the weather station provides weather information, such as wind speed, crosswind, headwind, temperature, relative humidity, barometric pressure, altitude and etc., transmits the weather information to the target acquisition device 10 or/and the mobile device 50, such that the weather information can be shown on the display 18 of the target acquisition device 10 or/and the display 52 of the mobile device 50. If a night vision is connected to the target acquisition device 10 or the mobile device 50, the night vision provides enhanced image for the user to observe the target in a low light environment. If a camera is connected to the target acquisition device 10 or the mobile device 50, the camera records the trajectory of the ammunition or the video of an activity.

In one embodiment of the present invention, the target acquisition system 40 further comprises a web service platform 48, wherein the mobile device 50 is able to connect to Internet and access the web service platform 48. The web service platform 48 comprises databases 481 of weapons, ammunitions and ballistic parameters. If a user registers his/her weapon and ammunition on the web service platform 48, once the user uses the mobile device 50 to connect and login to the web service platform 48, the ballistic parameters corresponding to the weapon and ammunition can be downloaded to the mobile device 50 for trajectory calculation. The mobile device 50 calculates the trajectory and transmits the trajectory to the target acquisition device 10. The target acquisition device 10 can show the trajectory on the display 18 or calibrate the location of the reticle according to the trajectory. The mobile device 50 can also receive manual inputs of the weapon type and the ammunition type, and calculate the trajectory according to the ballistic parameters. The web service platform 48 may also store reticles corresponding to the weapons, information downloads and software updates 485 that can be pushed to the corresponding target acquisition device 10 from said account when the mobile device 50 or the target acquisition device 10 itself is connected to the web service platform 48.

In one embodiment of the present invention, the target acquisition system 40 further comprises a remote support 49 selectively connected to the web service platform 48 or the mobile device 50 for providing remote supports. The remote support is selectively one of a remote weather service, an application support or the combination thereof.

In one embodiment of the present invention the web service platform 48 further comprises a user interface 483 for a plurality of users to register an account on the web service platform respectively. The user interface 483 allows the plurality of users to transmit the locations of the mobile devices 50 (also represent the locations of the users) and the locations of the associated targets to the web service platform 48, and the mobile device 50 is able to receive the locations of the mobile devices and the locations of the targets from the web service platform 48 and display in the map 58 shown on the display 52 of the mobile device 50.

In one embodiment of the present invention, the user interface 483 and the mobile device 50 allow the locations of the mobile devices to be filtered and sorted in group. The location of the mobile device of a friend user and the location of the associated target 585 can be shown in the map 58 on the display 52 of the mobile device 50 simultaneously. The locations of the mobile devices are transmitted to the target acquisition device 10, and the target acquisition device 10 warns when the locations of the mobile devices are determined to show in the display 18 of the target acquisition device 10. If the location of the mobile device belonging to a friend user is determined to shown in the display 18 of the target acquisition device 10, the target acquisition device 10 warns and enables the safety feature of the weapon not to fire to the friend user. If the location of the mobile device belonging to an enemy user is determined to shown in the display 18 of the target acquisition device 10, the target acquisition device 10 warns and disables the safety feature of the weapon to fire to the enemy user.

In one embodiment of the present invention, the user interface 483 allows the users to communicate with each other by using the mobile device including voice and data.

In one embodiment of the present invention, the mobile device 50 is selectively one of a mobile phone, a personal digital assistant, a tablet computer or a laptop computer.

Although particular embodiments of the invention have been described in detail for purposes of illustration, various modifications and enhancements may be made without departing from the scope of the invention specified by the claims.

What is claimed is:

1. A target acquisition device comprising:
   a lens set acquiring an image of a scene;
   an image sensor receiving the image from the lens set and generating an image signal;
   a compass determining an orientation and an elevation of the device and generating an orientation signal and an elevation signal respectively;
   an acceleration sensor determining transitions of the device and generating transition signals;
   an accessory connector for connecting to an assistant device;
   a display;
   a sight control circuit connected to the image sensor, the lens set, the compass, the acceleration sensor, the accessory connector and the display for controlling the lens set to operate, receiving the image signal, the orientation signal, the elevation signal, the transition signals and signals from the at least one assistant device, wherein the sight control circuit generates a reticle, combines the reticle and the received signals with the image signal and displays on the display;
   a wireless transmission circuit for connecting to a mobile device; and
   a web service platform connected with the mobile device via an Internet, wherein the web service platform further comprises a user interface for a plurality of users to register an account on the web service platform respectively, wherein the user interface allows the plurality of users to transmit the locations of the mobile devices and the locations of the targets to the web service platform, wherein the mobile device receives the locations of the mobile devices and the locations of the targets from the web service platform and displays on the map shown in the display of the mobile device, wherein the locations of the mobile devices are filtered and sorted in group, wherein when the location of the mobile device belonging to a friend user is shown in the display of the target acquisition device, the target acquisition device warns and enables a safety mode.

2. The device as claimed in claim 1, wherein the assistant device is selectively one of a range finder, a remote control, a weather station, a global positioning system (GPS), a night vision, a recorder, a camera or the combination thereof.

3. The device as claimed in claim 1, wherein the target acquisition device is selectively disposed on a weapon or a helmet.

4. The device as claimed in claim 1, wherein the mobile device is selectively one of a mobile phone, a personal digital assistant, a tablet computer or a laptop computer.

5. The device as claimed in claim 4, wherein the wireless transmission circuit is selectively one of a Bluetooth circuit, a wireless network circuit or the combination thereof.

6. The device as claimed in claim 1, wherein an acceleration profile comprising forward and reversed acceleration thresholds is set in the sight control circuit for counting shots produced by an attached weapon.

7. The device as claimed in claim 6, wherein a shot counter according to the shots produced by the attached weapon is displayed on the display of the target acquisition device.

8. A target acquisition system comprising:
   a target acquisition device including:
      a lens set acquiring an image of a scene;
      an image sensor receiving the image from the lens set and generating an image signal;

a compass determining an orientation and an elevation of the device and generating an orientation signal and an elevation signal respectively;

an acceleration sensor determining transitions of the device and generating transition signals;

an accessory connector;

a wireless transmission circuit;

a display; and a sight control circuit connected to the image sensor, the lens set, the compass, the acceleration sensor, the accessory connector, the wireless transmission circuit and the display for controlling the lens set to operate, receiving the image signal, orientation signal, elevation signal and transition signals;

a range finder determining a range to a target and generating a range signal, wherein the range finder is paired with the target acquisition device and connected to the target acquisition device by the accessory connector;

a mobile device having a display, a GPS circuit and a wireless transmission circuit, wherein the mobile device is connected to the target acquisition device by the wireless transmission circuit of the mobile device and the wireless transmission circuit of the target acquisition device, the GPS circuit determines a location of the mobile device and generates a location signal, wherein the sight control circuit generates a reticle, receives the range signal from the range finder, the location signal from the mobile device, combines the reticle and the received signals with the image signal and displays on the display of the target acquisition device, wherein the mobile device receives the orientation signal, the elevation signal, the transition signals and the range signal from the target acquisition device and processes to find a location of the target, and display the location of the mobile device, the location of the target, the range, the elevation, the orientation and a map on the display of the mobile device; and a web service platform connected with the mobile device via an Internet, wherein the web service platform further comprises a user interface for a plurality of users to register an account on the web service platform respectively, wherein the user interface allows the plurality of users to transmit the locations of the mobile devices and the locations of the targets to the web service platform, wherein the mobile device receives the locations of the mobile devices and the locations of the targets from the web service platform and displays on the map shown in the display of the mobile device, wherein the locations of the mobile devices are filtered and sorted in group, wherein when the location of the mobile device belonging to a friend user is shown in the display of the target acquisition device, the target acquisition device warns and enables a safety mode.

9. The system as claimed in claim 8, further comprising an assistant device selectively connected to the target acquisition device or the mobile device.

10. The system as claimed in claim 9, wherein the assistant device is selectively one of a remote control, a weather station, a night vision, a recorder, a camera or the combination thereof.

11. The system as claimed in claim 8, further comprising a remote support connected to the web service platform or the mobile device for providing remote supports.

12. The system as claimed in claim 11, wherein the remote support is selectively one of a remote weather service, an application support or the combination thereof.

13. The system as claimed in claim 8, wherein the web service platform comprises databases of weapons, ammunitions and ballistic parameters.

14. The system as claimed in claim 13, wherein the mobile device accesses the databases of the web service platform, calculates a trajectory and transmits the trajectory to the target acquisition device; wherein the target acquisition device displays the trajectory on the display of the target acquisition device.

15. The system as claimed in claim 13, wherein the mobile device is able to receive manual inputs of a weapon type and an ammunition type, access the databases of the web service platform, calculate a trajectory and transmit the trajectory to the target acquisition device; wherein the target acquisition device displays the trajectory on the display of the target acquisition device.

16. The system as claimed in claim 13, wherein the databases of the web service platform further comprise a plurality of reticles corresponding to the weapons which can be loaded to the target acquisition device when the mobile device or the target acquisition device is connected to said web service platform.

17. The system as claimed in claim 13, wherein the web service platform further comprises a plurality software updates which can be loaded to the target acquisition device when the mobile device or the target acquisition device is connected to said web service platform.

18. The system as claimed in claim 8, wherein the user interface allows the users to communicate with each other by using the mobile device.

19. The system as claimed in claim 8, wherein the target acquisition device and the range finder are selectively disposed on a weapon or a helmet.

* * * * *